(12) United States Patent
Kurasawa et al.

(10) Patent No.: US 6,562,887 B1
(45) Date of Patent: May 13, 2003

(54) POLYCARBONATE RESIN COMPOSITION

(75) Inventors: Yoshihiro Kurasawa, Hiratsuka (JP);
Naoto Obayashi, Hiratsuka (JP);
Takashi Miyajima, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/512,573

(22) Filed: Feb. 24, 2000

(30) Foreign Application Priority Data

Feb. 26, 1999 (JP) ............................................ 11-049730
Feb. 26, 1999 (JP) ............................................ 11-049731

(51) Int. Cl.⁷ ........................ C08L 69/00; C08K 5/5419
(52) U.S. Cl. ........................ 524/269; 524/267; 524/268; 525/63; 525/67; 525/101
(58) Field of Search ................................ 524/267, 268, 524/269; 525/63, 67, 101

(56) References Cited

U.S. PATENT DOCUMENTS 6,197,857 B1 * 3/2001 Nodera

FOREIGN PATENT DOCUMENTS

| JP | 09-255864 | * | 9/1997 |
| JP | 10-101920 | * | 4/1998 |

OTHER PUBLICATIONS

Machine Translation of JP 10–101920, Apr. 1998.*

* cited by examiner

*Primary Examiner*—David J. Buttner
(74) *Attorney, Agent, or Firm*—George W. Neuner; Edwards & Angell, LLP

(57) ABSTRACT

The present invention relates to a polycarbonate resin composition comprising 100 parts by weight of a polycarbonate resin, 0.05 to 5 parts by weight of a silicone oil (BH) having a dynamic viscosity of not less than 10,000 mm²/s at 25° C., and 0.5 to 25 parts by weight of a composite rubber (C) having such structure that the polyorganosiloxane rubber component and the polyalkyl (meth)acrylate rubber component are interlocked to form a unitary composite.

13 Claims, No Drawings

POLYCARBONATE RESIN COMPOSITION

BACKGROUND OF THE INVENTION

The present invention relates to a polycarbonate resin composition, particularly the one having excellent sliding properties.

Recently, for the purpose of expediting size and weight reduction or decrease of the number of parts of OA equipment and electronic devices in general, use of synthetic resins for the sliding members is prevailing. Among such synthetic resins, polycarbonate resins are favorably used for the parts of the sliding members such as gears because of their excellent dimensional precision and mechanical strength.

Usually, for improving the sliding properties, a sliding material is added to the polycarbonate resins. For instance, Japanese Patent Application Laid-Open (KOKAI) No. 63-213555 discloses a resin composition comprising a polycarbonate resin and ethylene tetrafluoride resin. Such a resin composition, however, has a problem that it tends to cause delamination or mold deposit during the molding operations because a large amount of a fluorine resin having no miscibility must be used. Japanese Patent Application Laid-Open (KOKAI) No. 4-136065 discloses a resin composition comprising polybutylene terephthalate and a polycarbonate. This resin composition involves a problem that not only the excellent properties (mechanical strength, heat resistance and flame retardancy) inherent to the polycarbonate resins are impaired but there also is a risk of phase separation taking place during molding.

Further, a resin composition produced by blending a silicone oil in a polycarbonate resin has been proposed. In the case of this composition, there is a problem that the article surface becomes tacky to spoil the sliding properties because the silicone oil in the surface of the molded article oozes out in a short time. As a solution to this problem, use of a high-molecular weight silicone oil has been proposed. In this case, however, as it is necessary to add a large quantity of silicone oil for obtaining satisfactory sliding properties, there tends to arise problems such as non-uniform glossiness of the molding surface due to phase separation of the silicone oil in the surface of the molded article, so that this resin composition is unsuited for practical use.

Further, Japanese Patent Application Laid-Open (KOKAI) No. 9-255864 provides a polycarbonate resin composition in which a high-viscosity dimethyl silicone oil and a polyolefin, polystyrene, acrylonitrile-styrene resin or acrylonitrile-butadiene-styrene resin are added to a basic polycarbonate resin for improving miscibility between the polycarbonate resin and the silicone oil. This polycarbonate resin composition, however, is not always satisfactory in balance of mechanical properties, molded article appearance and sliding properties.

As a result of the present inventors' earnest studies to solve the above problem, it has been found that by blending a silicone oil having specific dynamic viscosity and a rubber component having a specific structure with a polycarbonate resin, the obtained resin composition has excellent sliding properties without imparting the inherent properties of polycarbonate resin.

The present invention has been attained on the basis of the above finding.

SUMMARY OF THE INVENTION

The object of the present invention is to provide a polycarbonate resin composition having excellent sliding properties and capable of providing good appearance to its molded articles without impairing the inherent properties such as mechanical strength and heat resistance of the polycarbonate resins.

To attain the above aim, in the first aspect of the present invention, there is provided a polycarbonate resin composition comprising 100 parts by weight of a polycarbonate resin, 0.05 to 5 parts by weight of a silicone oil (BH) having a dynamic viscosity of not less than 10,000 m$^2$/s at 25° C., and 0.5 to 25 parts by weight of a composite rubber (C) having such a structure that the polyorganosiloxane rubber component and the polyalkyl (meth)acrylate rubber component are interlocked to form a unitary composite (intertwined with each other).

In the second aspect, there is provided a polycarbonate resin composition comprising:

100 parts by weight of a polycarbonate resin;

0.05 to 5 parts by weight of a mixture of silicone oil (BH) having a dynamic viscosity of not less than 100,000 mm$^2$/s at 25° C. and a silicone oil (BL) having a dynamic viscosity of less than 100,000 mm$^2$/s at 25° C., with the BH/BL ratio by weight being defined to be 2/1 to 200/1; and 0.5 to 25 parts by weight of a composite rubber (C) having such a structure that the polyorganosiloxane rubber component and the polyalkyl (meth)acrylate rubber component are interpenetrated with each other.

DETAILED DESCRIPTION OF THE INVENTION

The present invention is described in detail below.

As the polycarbonate resin (A) (which may hereinafter be referred to as a "PC resin") usable in the present invention, there exemplified aromatic PC resins, aliphatic PC resins, and aromatic/aliphatic PC resins. Of these resins, aromatic PC resins are preferred. Examples of such aromatic PC resins include thermoplastic aromatic polycarbonate polymers or copolymers which may be branched, which can be obtained by reacting an aromatic hydroxyl compound or this compound and a small quantity of a polyhydroxyl compound with phosgene or a carbonic acid diester. The preparation method of these PC resins is not specified in the present invention; the conventional methods such as phosgene method (interfacial polymerization method) and melting method (ester exchange method) can be used. It is also possible to use aromatic PC resins produced by the melting method, with the number of the terminal OH groups being properly adjusted.

Examples of the aromatic dihydroxyl compounds usable for the above reaction include 2,2-bis(4-hydroxyphenyl) propane (bisphenol A), tetramethylbisphenol A, bis(4-hydroxyphenyl)-p-diisopropylbenzene, hydroquinone, resorcinol, 4,4-dihydroxydiphenyl and the like. Of these compounds, bisphenol A is preferred. It is possible to use compounds having at least one tetraalkylphosphonium sulfonate combined with the said aromatic dihydroxyl compounds and/or polymers or oligomers having a siloxane structure and containing phenolic OH groups at the terminal for the purpose of further enhancing flame retardancy.

For obtaining a branched aromatic PC resin, a polyhydroxyl compound such as phloroglucin, 4,6-dimethyl-2,4,6-tri(4-hydroxyphenyl)heptene-2,4,6-dimethyl-2,4,6-tri(4-hydroxyphenyl)heptane, 2,6-dimethyl-2,4,6-tri(4-hydroxyphenyl)heptene-3,1,3,5-tri(4-hydroxyphenyl) benzene and 1,1,1-tri(4-hydroxyphenyl)ethane; 3,3-bis(4- hydroxyaryl)oxyindole (isatinbiphenol), 5-chloroisatin, 5,7-dichloroisatin, 5-bromoisatin or the like is used as part of the aromatic dihydroxyl compound mentioned above. Such an additive compound is used in an amount of usually 0.01 to 10 mol %, preferably 0.1 to 2 mol %.

The monovalent aromatic hydroxyl compounds can be used for modifying the molecular weight. Examples of such monovalent aromatic hydroxyl compounds include m- and p-methylphenol, m- and p-propylphenol, p-tert-butylphenol and p-long-chain alkyl substituted phenol.

As the aromatic PC resin, it is preferable to use the PC resins derived from 2,2-bis(4-hydroxyphenyl)propane or the PC copolymers derived from 2,2-bis(4-hydroxyphenyl) propane and other aromatic dihydroxyl compounds. They may be copolymerized with a polymer or oligomer having a siloxane structure for further enhancing flame retardancy. Two or more different types of aromatic PC resin may be used as a mixture.

The viscosity-average molecular weight of the PC resin used in the present invention, as calculated by conversion from the solution viscosity measured at 25° C. using methylene chloride as solvent, is usually in the range of 16,000 to 30,000. If the viscosity-average molecular weight is less than 16,000, the produced composition may be poor in mechanical strength, and if the viscosity-average molecular weight exceeds 30,000, the articles molded from the composition tend to become defective in appearance. The preferred range of the viscosity-average molecular weight of the PC resin used in the present invention is 17,000 to 25,000, more preferably 18,000 to 23,000.

It is essential that the silicone oil (BH) used in the present invention has a dynamic viscosity of not less than 10,000 $mm^2/s$ measured at 25° C. If the dynamic viscosity of the silicone oil (BH) measured at 25° C. is less than 10,000 $mm^2/s$, it may be difficult to retain the sliding properties for a long time. The dynamic viscosity of the silicone oil (BH) measured at 25° C. is preferably not less than 100,000 $mm^2/s$, more preferably not less than 500,000 $mm^2/s$, even more preferably not less than 1,000,000 $mm^2/s$.

In the present invention, the content of silicone oil (BH) is 0.05 to 5 parts by weight based on 100 parts by weight of the PC resin (A). If the silicone oil content is less than 0.05 part by weight, the composition may be unsatisfactory in sliding properties, and if the said content exceeds 5 parts by weight, there can not be obtained a good appearance of the molded article. The silicone oil content is preferably 0.1 to 4 parts by weight, more preferably 0.2 to 3 parts by weight based on 100 parts by weight of the PC resin (A).

In case where the silicone oil (BH) having a dynamic viscosity of not less than 100,000 $mm^2/s$ is used, it is preferable to use a silicone oil (BL) having a dynamic viscosity of less than 100,000 $mm^2/s$ at 25° C. along with the said silicone oil (BH), with the BH/BL ratio by weight being defined to be 2/1 to 200/1, because the specific wear loss can be reduced by the combined use of such two types of silicone oil.

In case of the combined use of such two types of silicone oil, the dynamic viscosity of the silicone oil (BH) at 25° C. is preferably not less than 500,000 $mm^2/s$, more preferably not less than 1,000,000 $mm^2/s$. The dynamic viscosity of the silicone oil (BL) at 25° C. is preferably not more than 50,000 $mm^2/s$, more preferably not more than 10,000 $mm^2/s$. The BH/BL ratio by weight is preferably 5/1 to 150/1, more preferably 10/1 to 100/1. A too high ratio of the silicone oil (BH) tends to reduce wear resistance of the composition and also may give adverse effect to the appearance of the molded article. Also, a too high ratio of the silicone oil (BL) tends to lower wear resistance of the composition and may make the molded article too tacky.

The silicone oils used in the present invention are not specified but can be properly selected from the known ones as far as they meet the above-defined conditions of dynamic viscosity. For instance, it is possible to use silicone oils comprising polydimethylsiloxane, silicone oils in which the methyl groups of polydimethylsiloxane are partly or entirely substituted with phenyl group, hydrogen, alkyl group having 2 or more carbon atoms, halogenated phenyl group or fluoroester group, epoxy-modified silicone oils having epoxy groups, amino-modified silicone oils having amino groups, alcohol-modified silicone oils having alcoholic hydroxyl groups, and polyether-modified silicone oils having a polyether structure. These silicone oils can be used either singly or as a mixture of two or more of them. In case of using a silicone oil (BL) of low dynamic viscosity in combination with a silicone oil (BH) of high dynamic viscosity as mentioned above, the silicone oil (BL) is preferably selected from those having phenyl groups.

In the present invention, a composite rubber (C) having such structure that the polyorganosiloxane rubber component and the polyalkyl (meth)acrylate rubber component are interlocked (intertwined) with each other, is used. In such a composite rubber (C), a polymer having the repeating units selected from dimethylsiloxane, diphenylsiloxane and methylphenylsiloxane is used as the skeleton of the polyorganosiloxane rubber component. On the other hand, as the skeleton of the polyalkyl (meth)acrylate rubber component, a polymer having the repeating units selected from methyl (meth)acrylate, ethyl (meth)acrylate, n-propyl (meth) acrylate, n-butyl (meth)acrylate and 2-ethylhexyl (meth) acrylate is used.

Emulsion polymerization is preferably used as the method of producing the composite rubber (C) in the present invention. First, a latex of polyorganosiloxane rubber is prepared, then a monomer for synthesizing alkyl (meth)acrylate rubber is interpenetrated in the particles of the polyorganosiloxane rubber latex, and then the monomer is polymerized.

The polyorganosiloxane rubber component/polyalkyl (meth)acrylate rubber component ratio by weight is usually 90/10 to 20/80, preferably 85/15 to 30/70, more preferably 80/20 to 40/60. If the ratio of the polyalkyl (meth)acrylate rubber component is below the above-defined range, its miscibility with the PC resin becomes too low, causing deterioration of appearance of the molded article, while if the said ratio exceeds the above-defined range, the improving effect of sliding properties may be unsatisfactory.

A vinyl monomer may be graft-polymerized to the composite rubber (C). Various types of vinyl monomers, for example, aromatic alkenyl compounds such as styrene, acrylic esters such as methyl methacrylate, and vinyl cyanide compounds such as acrylonitrile can be used either singly or as preferable combinations. Such a composite rubber (C) is easily available as it is commercially sold, for instance, under the trade name of "METABLEN" by Mitsubishi Rayon Co., Ltd. The above mentioned method is described in detail in U.S. Pat. No. 4,888,388, but the method producing the composite rubber (C) is not limited to the above described method.

The content of the composite rubber (C) is 0.5 to 25 parts by weight based on 100 parts by weight of the PC resin (A). If the composite rubber (C) content is too low, the improving effect of sliding properties may be unsatisfactory, and if the content is too high, the composition deteriorates in mechanical strength. The (C) content is preferably 0.8 to 20 parts by weight, more preferably 1 to 15 parts by weight based on 100 parts by weight of the PC resin (A).

The silicone oil (BH)/composite rubber (C) ratio by weight is usually 5/1 to 1/50, preferably 2/1 to 1/30. If the BH/C ratio is outside the above-defined range, the composition may be low in mechanical strength and/or appearance of the molded article may be deteriorated.

The PC resin composition of the present invention may contain, if necessary, stabilizers such as ultraviolet absorber and antioxidant, additives such as pigment, dye, lubricant, flame retardant and release agent, reinforcements such as glass fiber, glass flakes and carbon fiber, whiskers such as those of potassium titanate and aluminum borate, and the like.

Also, in the PC resin composition of the present invention, it is possible to blend other thermoplastic resin(s) than the PC resins for the purpose of improving performance qualities such as moldability and chemical resistance of the composition. The kind and the content of such other thermoplastic resin(s) can be properly selected. Examples of such other thermoplastic resins include polyester resins, polyamide resins, polyolefin resins, polyphenylene ether-based resins, styrene-based resins, polysulfone, polyether sulfone, polyphenylene sulfide, polyarylates, polyamide-imide, polyether-imide and the like.

The polyester resins usable for the said purpose include polybutylene terephthalate, polyethylene terephthalate, polybutylene naphthalate and polyethylene naphthalate. The polyolefin resins include polyethylene and polypropylene. The polyphenylene ether-based resins include a polyphenylene ether resin and a mixture of polyphenylene ether, polystyrene and/or HIPS. The styrene-based resins include polystyrene, HIPS (high impact-resistant polystyrene), AS (acrylonitrile-styrene) resin and ABS (acrylonitrile-butadiene-styrene) resin.

The amount of the other thermoplastic resin(s) blended in the PC resin is usually less than 50% by weight, preferably not more than 40% by weight, more preferably not more than 30% by weight, based on the combined amount of the PC resin and the other resin(s). The lower limit is usually 1% by weight.

For producing the PC resin composition of the present invention, it is possible to use, for instance, a melt mixing method in which the components described above are blended and mixed by various types of mixing means such as single- or multi-screw mixer, Banbury mixer, roll mill, Brabender Plastograph, etc., and then cooled and solidified, or a solution mixing method in which the said components are added to a preferable solvent, for example, a hydrocarbon such as hexane, heptane, benzene, toluene, xylene, or a derivative thereof, and the dissolved components are mixed together, or the dissolved components and the undissolved components are mixed in a suspended state. The melt mixing method is advantageous in terms of cost.

The method of molding the PC resin composition of the present invention is not specified; the various molding methods commonly used for the molding of the thermoplastic resin compositions, such as injection molding, blow molding, extrusion molding, sheet forming, thermoforming, rotational molding, laminate molding, etc., can be used.

The PC resin composition according to the present invention has excellent Izod impact strength, flexural modulus of elasticity, flexural fatigue failure, heat resistance and sliding properties and is capable of providing good appearance of the molded articles, so that it is useful for the manufacture of various kinds of sliding members such as gears. Thus, the present composition is of high industrial value and finds its wide scope of use, for instance in the fields of electrical and electronic devices and parts of OA equipment.

EXAMPLES

The present invention will be further illustrated by the following examples, which examples, however, are merely intended to be illustrative and not to be construed as limiting the scope of the invention in any way. In the following Examples and Comparative Examples, the following materials and evaluation methods were used.

Materials (1) PC Resin

Poly-4,4-isopropylidenediphenyl carbonate (Mv: 21,000; "Iupiron S-3000" produced by Mitsubishi Engineering-Plastics Corporation)

(2) Silicone Oil (B1)

Polydimethylsiloxane (dynamic viscosity at 25° C. 6,000,000 mm$^2$/s; "VRS-01" produced by Shin-Etsu Silicone Co., Ltd.)

(3) Silicone Oil (B2)

Polydimethylsiloxane (dynamic viscosity at 25° C.: 500 mm$^2$/s; "KF-96" produced by Shin-Etsu Silicone Co., Ltd.)

(4) Silicone Oil (B3)

Masterbatch comprising a PC resin and 40% by weight of polydimethylsiloxane (polydimethylsiloxane dynamic viscosity at 25° C.: not less than 100,000 mm$^2$/s; "BX27-015" produced by Toray Dow Corning Silicone Co., Ltd.)

(5) Silicone Oil (B4)

Phenyl-modified polydimethylsiloxane (dynamic viscosity at 25° C.: 400 mm$^2$/s, "KF-54" produced by Shin-Etsu Silicone Co., Ltd.)

(6) Silicone Oil (B5)

Masterbatch comprising an ABS resin and 50% by weight of polydimethylsiloxane (polydimethylsiloxane dynamic viscosity at 25° C.: not less than 100,000 mm$^2$/s; "BY27-007" produced by Toray Dow Corning Silicone Co., Ltd.)

(7) Polyorganosiloxane-poly-alkyl (meth)acrylate Composite Rubber

Polydimethylsiloxane-poly-n-butyl acrylate composite rubber (polydimethylsiloxane rubber content: 70 wt %; "METABLEN SX005" produced by Mitsubishi Rayon Co., Ltd.)

Evaluation Methods (1) Izod Impact Strength

A notched Izod impact test was conducted according to ASTM D256.

(2) Flexural Modulus in Elasticity

A three-point bending test was conducted according to the bending test method of ASTM D790.

(3) Thermal Deformation Temperature

A deflection-under-load test was conducted at 1.82 MPa according to ASTM D648.

(4) Flexural Fatigue Failure

A flexural fatigue failure test was conducted according to ASTM D671 using Type A test pieces at 23° C. under a working stress of 19 MPa. The number of the runs that lasted until fatigue failure occurred was counted.

(5) Sliding Properties (Friction and Wear Loss)

A sliding test was conducted according to JIS K7218 A method using a S45C ring as the sliding partner under the following conditions: load=5 kg (surface pressure=2.5 kg/cm$^2$); peripheral speed=10 cm/sec; running time=10 hours. The specific wear loss was calculated from the wear loss according to the following equation.

Specific wear loss(mm$^3$/N·km)=wear loss(g)/density(g/ mm³)·load(N)·distance covered(km)

(6) Appearance of Molded Article

Appearance of the test pieces used for the repeated flexural fatigue failure test was visually observed and rated according to the following criterion.

○: good
Δ: slightly defective
×: bad

Examples 1 to 4

A PC resin and a silicone oil were uniformly mixed at a PC resin to silicone oil weight ratio of 90 to 10 by a mixer and pelletized using a twin-screw extruder (mfd. by Japan Steel Works, Ltd.) at a cylinder temperature of 280° C. and a screw speed of 250 rpm to obtain the master pellets. These master pellets, a PC resin and a composite rubber were uniformly mixed by a mixer at the rates shown in Table 1 and pelletized by a twin-screw extruder (mfd. by Japan Steel Works, Ltd.) at a cylinder temperature of 280° C. and a screw speed of 250 rpm. The thus obtained resin pellets were injection molded and the molded articles were subjected to various evaluations. Injection molding was conducted using an injection molding machine mfd. by Japan Steel Works, Ltd., under the following conditions: clamping force=50 T; cylinder temperature=280° C.; mold temperature=80° C. The evaluation results are shown in Table 1.

Examples 5 and 6

The master pellets were obtained in the same way as Example 1 except that the silicone oil (B3) which is a commercial PC resin masterbatch, was used in the ratios shown in Table 2 in place of the silicone oil (B1), and the pellets were made according to the procedure of Example 1. The obtained pellets were molded into the articles and they were subjected to various evaluations in the same way as Example 1. The evaluation results are shown in Table 2. The blending amount of silicone oil (B3) shown in Table 2 is a calculated amount in which the total amount is divided to PC resin and silicone oil.

Examples 7 and 8

The master pellets were obtained in the same way as Example 1 except that a low-viscosity silicone oil (B-4) was used together with the silicone oil (B-1) in the ratios shown in Table 2, and the pellets were made according to the procedure of Example 1. The obtained pellets were molded into the articles and they were subjected to various evaluations in the same way as Example 1. The evaluation results are shown in Table 2.

Comparative Examples 1 and 2

A PC resin and a composite rubber were uniformly mixed in the ratios shown in Table 3 by a mixer and pelletized using a twin-screw extruder (mfd. by Japan Steel Works, Ltd.) at a cylinder temperature of 280° C. and a screw speed of 250 rpm. The obtained pellets were molded into the articles and these articles were subjected to various evaluations in the same way as Example 1. The evaluation results are shown in Table 3.

Comparative Example 3

The master pellets were obtained and the pellets were made in the same way as Example 3 except that no composite rubber was used. The obtained pellets were molded into the articles and they were subjected to various evaluations in the same way as Example 1. The evaluation results are shown in Table 3.

Comparative Example 4

The master pellets were obtained and the pellets were made in the same way as Comparative Example 3 except that the content of the silicone oil was increased. The pellets were molded into the articles and they were subjected to various evaluations in the same way as Example 1. The evaluation results are shown in Table 3.

Comparative Example 5

The master pellets were obtained and the pellets were made in the same way as Example 1 except that a silicone oil (B2) was used in place of the silicone oil (B1). The pellets were molded into the articles and they were subjected to various evaluations in the same way as Example 1. The evaluation results are shown in Table 4.

Comparative Example 6

The master pellets were obtained and the pellets were made in the same way as Example 1 except that a silicone oil (B5), which is a commercial ABS resin masterbatch, was used in place of the silicone oil (B1). The pellets were molded into the articles and they were subjected to various evaluations in the same way as Example 1. The evaluation results are shown in Table 4. The blending amount of silicone oil (B5) shown in Table 2 is a calculated amount in which the total amount is divided to ABS resin and silicone oil.

TABLE 1

| | Example 1 | Example 2 | Example 3 | Example 4 |
|---|---|---|---|---|
| Blend | | | | |
| PC resin (A) (parts by weight) | 100 | 100 | 100 | 100 |
| Silicone oil (B) | | | | |
| Type of BH[1] | B1 | B1 | B1 | B1 |
| Amount of BH (parts by weight) | 0.5 | 0.5 | 1.0 | 1.1 |
| Type of BL[2] | | | | |
| Amount of BL (parts by weight) | | | | |
| BH/BL (ratio by weight) | | | | |
| Composite rubber (C) (parts by weight) | 2.6 | 5.3 | 2.6 | 5.3 |
| Properties | | | | |
| Izod impact strength (J/M) | 840 | 870 | 830 | 860 |
| Flexural modulus (MPa) | 2200 | 2050 | 2200 | 2050 |
| Thermal deformation temperature (° C.) | 135 | 134 | 134 | 133 |
| Flexural fatigue failure (×10⁵ runs) | 8.5 | 4.2 | 5.1 | 3.0 |
| Specific wear loss ($10^{-3}$ mm³/N · km) | 24 | 10 | 7 | 3 |
| Appearance of molded article | ○ | ○ | ○ | ○ |

[1]BH: high dynamic viscosity silicone oil
[2]BL: low dynamic viscosity silicone oil

TABLE 2

| | Example 5 | Example 6 | Example 7 | Example 8 |
|---|---|---|---|---|
| Blend | | | | |
| PC resin (A) (parts by weight) | 100 | 100 | 100 | 100 |
| Silicone oil (B) | | | | |
| Type of BH[1)] | B3 | B3 | B1 | B1 |
| Amount of BH (parts by weight) | 0.5 | 1.0 | 1.0 | 1.1 |
| Type of BL[2)] | | | B4 | B4 |
| Amount of BL (parts by weight) | | | 0.02 | 0.05 |
| BH/BL (ratio by weight) | | | 50:1 | 20:1 |
| Composite rubber (C) (parts by weight) | 2.6 | 2.6 | 2.6 | 2.6 |
| Properties | | | | |
| Izod impact strength (J/M) | 840 | 820 | 820 | 820 |
| Flexural modulus (MPa) | 2200 | 2200 | 2200 | 2150 |
| Thermal deformation temperature (° C.) | 134 | 134 | 133 | 133 |
| Flexural fatigue failure (×10[5] runs) | 8.4 | 5.0 | 5.0 | 5.2 |
| Specific wear loss (10[−3] mm$^3$/N · km) | 24 | 9 | 3 | 2 |
| Appearance of molded article | ○ | ○ | ○ | ○ |

[1)]BH: high dynamic viscosity silicone oil
[2)]BL: low dynamic viscosity silicone oil

TABLE 3

| | Comp. Example 1 | Comp. Example 2 | Comp. Example 3 | Comp. Example 4 |
|---|---|---|---|---|
| Blend | | | | |
| PC resin (A) (parts by weight) | 100 | 100 | 100 | 100 |
| Silicone oil (B) | | | | |
| Type of BH[1)] | | | B1 | B1 |
| Amount of BH (parts by weight) | | | 1.0 | 11.1 |
| Type of BL[2)] | | | | |
| Amount of BL (parts by weight) | | | | |
| BH/BL (ratio by weight) | | | | |
| Composite rubber (C) (parts by weight) | 3.3 | 33.3 | | |
| Properties | | | | |
| Izod impact strength (J/M) | 880 | 900 | 820 | 140 |
| Flexural modulus (MPa) | 2200 | 1400 | 2300 | 1900 |
| Thermal deformation temperature (° C.) | 135 | 124 | 134 | 126 |
| Flexural fatigue failure (×10[5] runs) | 6.4 | 2.2 | 7.5 | 3.1 |
| Specific wear loss (10[−3] mm$^3$/N · km) | 96 | 10 | 175 | 2 |
| Appearance of molded article | ○ | X | ○ | X |

[1)]BH: high dynamic viscosity silicone oil
[2)]BL: low dynamic viscosity silicone oil

TABLE 4

| | Comp. Example 5 | Comp. Example 6 |
|---|---|---|
| Blend | | |
| PC resin (A) (parts by weight) | 100 | 100 |
| Silicone oil (B) | | |
| Type of BH[1)] | B2 | B5 |
| Amount of BH (parts by weight) | 0.5 | 1.0 |
| Type of BL[2)] | | |
| Amount of BL (parts by weight) | | |
| BH/BL (ratio by weight) | | |
| Composite rubber (C) (parts by weight) | 2.6 | 2.6 |
| Properties | | |
| Izod impact strength (J/M) | 820 | 760 |
| Flexural modulus (MPa) | 2150 | 2150 |
| Thermal deformation temperature (° C.) | 133 | 131 |
| Flexural fatigue failure (×10[5] runs) | 6.3 | 5.1 |
| Specific wear loss (10[−3] mm$^3$/N · km) | 85 | 234 |
| Appearance of molded article | ○ | X |

[1)]BH: high dynamic viscosity silicone oil
[2)]BL: low dynamic viscosity silicone oil

What is claimed is:

1. A polycarbonate resin composition comprising 100 parts by weight of polycarbonate resin, 0.05 to 5 parts by weight of a silicone oil (BH) having a dynamic viscosity of not less than 100,000 mm$^2$/s at 25° C., and 0.5 to 25 parts by weight of a composite rubber (C) having such structure that the polyorganosiloxane rubber component and the polyalkly(meth)acrylate rubber component are interlocked to form a unitary composite,
    wherein a silicone oil (BL) having a dynamic viscosity of less than 100,000 mm$^2$/s at 25° C. is further used along with the silicone oil (BH), with the BH/BL ratio being defined to be 2/1 to 200/1.

2. The polycarbonate resin composition according to claim 1 wherein the dynamic viscosity of the silicone oil (BH) at 25° C. is not less than 500,000 mm$^2$/s.

3. The polycarbonate resin composition according to claim 1 wherein the dynamic viscosity of the silicone oil (BH) at 25° C. is not less than 1,000,000 mm$^2$/s.

4. The polycarbonate resin composition according to claim 1 wherein the dynamic viscosity of the silicone oil (BL) at 25° C. is not more than 50,000 mm$^2$/s.

5. The polycarbonate resin composition according to claim 1 wherein the dynamic viscosity of the silicone oil (BL) at 25° C. is not more than 10,000 mm$^2$/s.

6. The polycarbonate resin composition according to claim 1 wherein the silicone oil (BL) is a silicone oil having phenyl groups.

7. The polycarbonate resin composition according to claim 1 wherein the BH/BL ratio by weight is 5/1 to 150/1.

8. The polycarbonate resin composition according to claim 1 wherein the BH/BL ratio by weight is 10/1 to 100/1.

9. A polycarbonate resin composition consisting of 100 parts by weight of a polycarbonate resin, 0.05 to 5 parts by weight of a silicone oil (BH) having a dynamic viscosity of not less than 100,000 mm$^2$/s at 25° C., 0.5 to 25 parts by weight of a composite rubber (C) having such structure that the polyorganosiloxane rubber component and the polyalkyl (meth)acrylate rubber component are interlocked to form a unitary composite, and one or more additional components selected from the group consisting of stabilizers, additives, reinforcements, whiskers, polyester resins, polyamide resins, polyolefin resins, polyphenylene ether-based resins, polysulfone, polyether sulfone, polyphenylene sulfide, polyarylates, polyamide-imide, polyether-imide, polystyrene, HIPS (high impact-resistant polystyrene) and AS (acrylonitrile-styrene) resin.

10. A polycarbonate resin composition according to claim 9, wherein the stabilizers are ultraviolet absorber or antioxidant, the additives are pigment, dye, lubricant, flame retardant or release agent, the reinforcements are glass fiber, glass flakes or carbon fiber, and whiskers are potassium titanate or aluminum borate.

11. A polycarbonate resin composition according to claim 9, wherein the polyester resins are polybutylene terephthalate, polyethylene terephthalate, polybutylene naphthalate or polyethylene naphthalate.

12. A polycarbonate resin composition according to claim 9, wherein the polyolefin resins are polyethylene or polypropylene.

13. A polycarbonate resin composition according to claim 9, wherein the polyphenylene ether-based resins are a polyphenylene ether resin, a mixture of polyphenylene ether and polystyrene, a mixture of polyphenylene ether and HIPS, or a mixture of polyphenylene ether, polystyrene and HIPS.

* * * * *